United States Patent [19]

Fehr et al.

[11] 4,146,805

[45] Mar. 27, 1979

[54] MAGNETIC DRIVE

[75] Inventors: Henri Fehr, Montmorency; Jakob Kaegi, La Celle-Saint-Cloud; Jose Mallen-Herrero, Paris, all of France

[73] Assignee: Compagnie de Construction Mecanique Sulzer, Paris, France

[21] Appl. No.: 637,400

[22] Filed: Dec. 3, 1975

[30] Foreign Application Priority Data

Dec. 2, 1974 [FR] France ................................ 74 39432

[51] Int. Cl.² ............................................. H02K 49/00
[52] U.S. Cl. .................................... 310/104; 310/103; 310/105; 310/86
[58] Field of Search ............................... 310/103–105, 310/86, 87, 271

[56] References Cited

U.S. PATENT DOCUMENTS

| 613,864 | 11/1898 | Moore | 310/104 X |
|---|---|---|---|
| 1,543,502 | 6/1925 | Hobart | 310/86 X |
| 1,697,142 | 1/1929 | Roller | 310/104 X |
| 2,463,936 | 3/1949 | Allison | 310/86 X |
| 2,481,172 | 9/1949 | Staggs | 310/104 X |
| 2,573,126 | 10/1951 | Andrus | 310/86 X |
| 2,898,485 | 8/1959 | Richter et al. | 310/104 |
| 3,283,187 | 11/1966 | Schaefer | 310/86 |
| 3,366,813 | 1/1968 | Madsen | 310/86 X |
| 3,890,515 | 6/1975 | Fehr et al. | 310/104 |

FOREIGN PATENT DOCUMENTS 1210852  11/1970  United Kingdom ..................... 310/104

Primary Examiner—Donovan F. Duggan
Attorney, Agent, or Firm—Kenyon & Kenyon, Reilly, Carr & Chapin

[57] ABSTRACT

The drive uses a recessed wall or partition between the pole-rings of the two rotors to substantially diminish the occurrence and strength of eddy currents. The recesses may be in the form of grooves, depressions or axial bores which reduce the mass of the wall. The wall is further reinforced by non-magnetic electrically non-conductive or insulated elements of high tensile strength to compensate for the reduction in strength caused by the grooves, depressions or bores.

17 Claims, 18 Drawing Figures

MAGNETIC DRIVE

This invention relates to a magnetic drive and particularly to a magnetic drive for the contactless transmission of a torque or rectilinear motion through a gas-tight or liquid-tight wall.

Heretofore, it has been known to use magnetic or electromagnetic couplers for the synchronous or asynchronous transmission of a torque. Usually, these couplers consist of a magnetic circuit and two rotors which can be coupled together over a magnetic field, whereby the one rotor is connected with a driving shaft and the other with a driven shaft. The coupling of the two rotors can be effected by a magnetic rotating field, inducted in the magnetic circuit by a stationary exciting coil supplied with DC or rectified current, or induced by permanent magnets, for example according to French Patent No. 1,095,374. Arrangements are also known in which two rotors are coupled magnetically to produce a reciprocating rectilinear or longitudinal movement, as described in French Patent No. 1,539,089 corresponding to British Patent No. 1,210,852.

In the event that the two areas in which the driving and driven elements are situated and moved, must be strictly separated from one another, then the air-gap existing between the two elements must be divided by a pressure-tight partition or wall which delimits the two areas. Such an arrangement is described for example in French Patent No. 1,539,090. In such a case, it would be desirable to make the partition of a nonmagnetizable electrically-insulating material. This would avoid any influence by the partition on the magnetic field in the air-gap. Thus, no eddy currents would be formed as a result of the magnetic flux coupling the driving element to the driven element.

However, while nonmetallic materials which are known at the present time would meet this requirement, they are not capable of taking extreme mechanical or heat stresses, such as occur for example in chemical or nuclear reactors, where temperatures of the order of 200° C. to 400° C. or more, and pressures of 100 bars or more have to be taken into consideration.

The partition, so far as itself is concerned, could be made of a nonmagnetizable metal with a high as possible a specific electric resistance and with mechanical characteristics meeting the requirements desired. However, if the difference in pressure between the two areas where the driving and driven elements are situated is very great, then the thickness of the partition must be made so great that the eddy currents (which increase approximately as the square of the wall thickness) assume large values with an extremely unfavorable influence. As a result, the partition cannot avoid a great, even unallowable, heating.

Accordingly, it is an object of the invention to avoid these above drawbacks and to create a pressure-tight magnetic drive which permits contactless operation of a machine having a container filled with a medium under high pressure and at high temperature, whereby the power transmitted is, depending on the existing circumstances, in the form of a torque or of a force acting rectilinearly in a reciprocating manner.

It is another object of the invention to reduce the heating effect of a magnetic circuit on a sealed wall between two rotors of a contactless drive.

It is another object of the invention to reduce the effects of eddy currents in a metallic wall between two rotors of a contactless drive.

It is another object of the invention to reduce the effects of eddy currents in a metallic wall between two rotors of a contactless drive without a loss in mechanical strength of the wall.

Briefly, the invention provides a contactless drive which is used in combination with a housing subject to high internal pressure and/or temperatures or used, for example to contain corrosive mediums. The drive includes a first movable means within the housing which has a tooth-like pole-ring of magnetizable material passing through an opening in the housing, a second movable means having a similar tooth-like pole ring of magnetizable material disposed coaxially and concentrically of the first pole-ring, a wall disposed coaxially and concentrically between the pole-ring to define air gaps with each and means for creating a closed torus-like magnetic circuit passing through the pole rings and wall. In addition, the wall or partition is made of non-magnetic material of high electric resistance and has a plurality of recesses therein. These recesses are formed in the region between the pole-rings in order to substantially reduce eddy currents in the cross-section of the wall and thus reduce power loss.

In order to compensate for the decrease in mechanical strength of the wall due to the recesses, reinforcing elements are used to reinforce the wall against tensile forces. These elements are made of non-magnetizable electrically non-conductive or insulated high tensile material and are prestressed.

The recesses in the wall may be formed to contain the reinforcing elements or not. For example, the recesses can be formed at the outside of the wall in the form of annular or helical grooves of low pitch in the peripheral direction. With this arrangement, the mechanically prestressed reinforcing elements are advantageously laid in the annular or helical grooves running in the peripheral direction, and have at least the same tensile strength as the material removed in making the grooves.

In another embodiment, the recesses are also at the outside of the partition and are made in the form of grooves running in an axial and/or radial direction. In that event, the mechanically prestressed reinforcing elements are laid in the grooves or bores running in the axial and/or radial direction, and are dimensioned so that they have at least the same tensile strength as the partition material removed in making the grooves or bores.

The recesses may moreover, according to a further embodiment be made in the form of rows or staggered honeycomblike recesses at at least one of the wall surfaces with annular or helical reinforcing elements laid round the outer surface of the wall. The mechanically prestressed reinforcing elements are, in this case, wound on the outside of the wall, and are supported at the upper edges of the webs remaining between the grooves or honeycomb recesses.

The recesses, however, do not need to be made at the outer or inner surface of the partition in every case. In accordance with a further embodiment, which is preferable in many cases, the recesses may be in the form of bores running axially within the wall. In this case, tie-rod type reinforcing elements are disposed in the bores. This embodiment also has the advantage that the bores may, in part at least, have a coolant flowing therein to be protected from excessively high temperatures.

The various forms of recesses described above all serve the same purpose in the partition, namely a substantial diminution of eddy currents in the cross-section of the wall for a given density of the magnetic field going through the air-gap and a specified relative speed between the magnetic poles and the wall. Further, the reinforcing elements which compensate for the material removed in making the grooves or bores with respect to the mechanical strength of the wall may be made of wire, strand or cable, of high tensile strength.

These and other objects and advantages of the invention will become more apparent from the following detailed description and appended claims taken in conjunction with the accompanying drawings in which:

FIG. 9b illustrates a view taken on line IX—IX of FIG. 9a;

Figure 10:
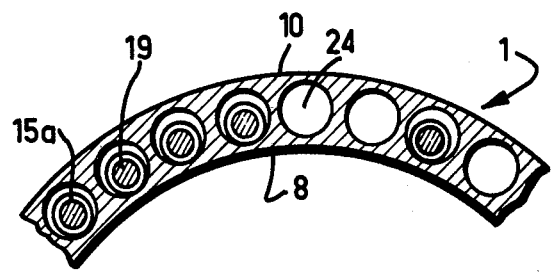
Figure 11:
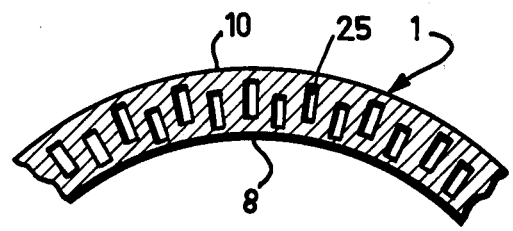
Figure 12:
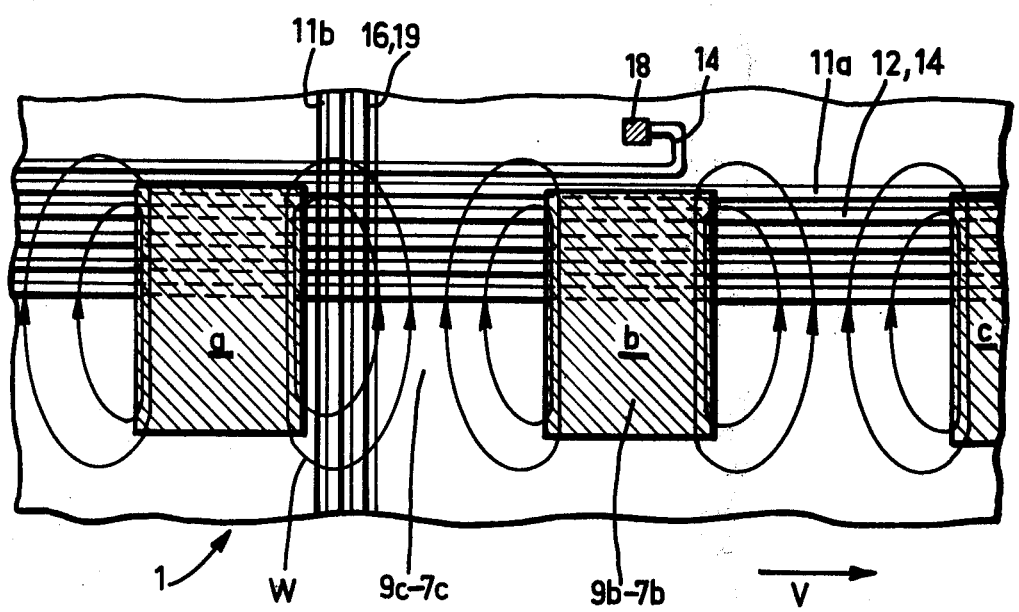
Figure 13:
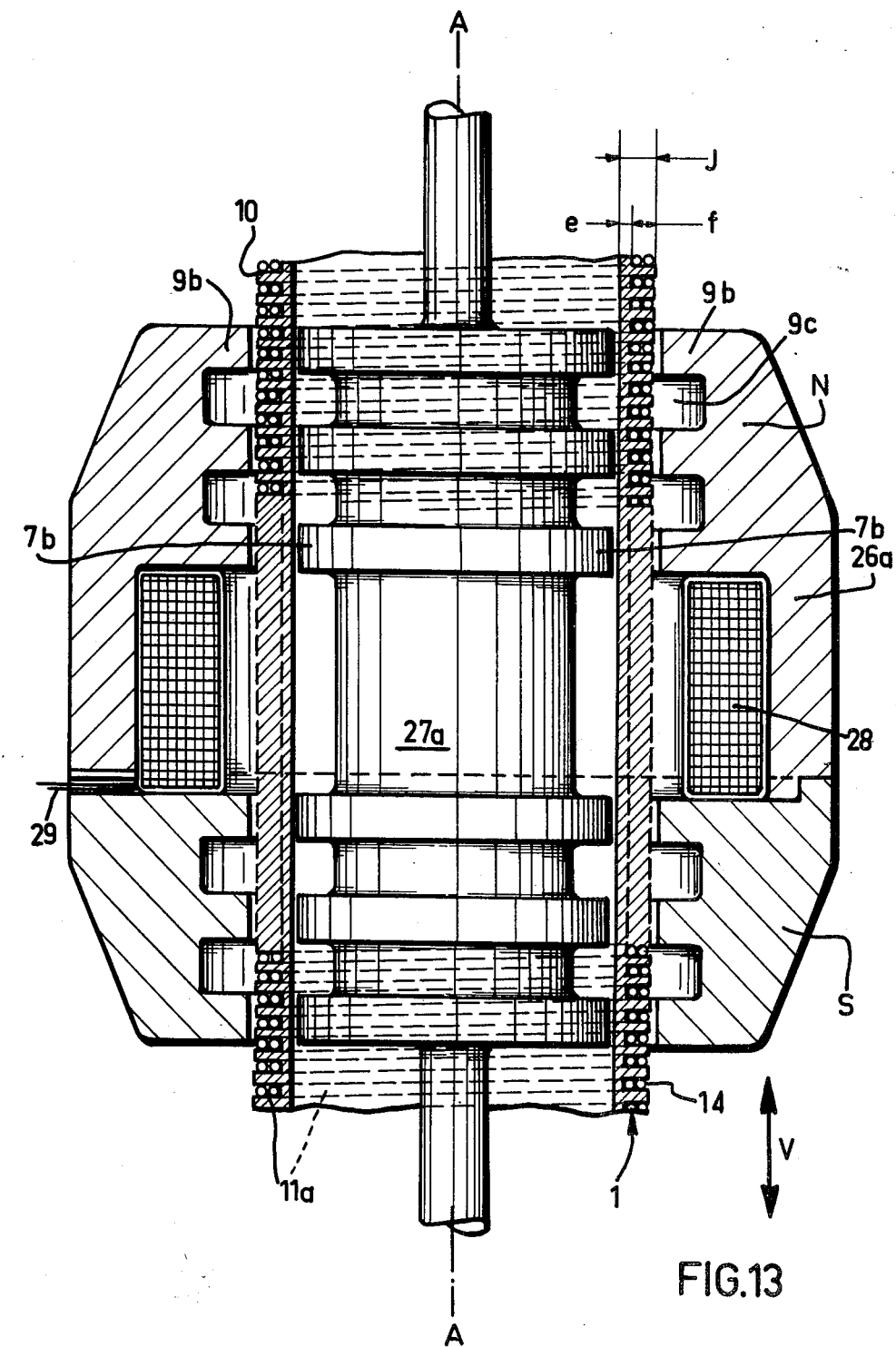
Figure 14:
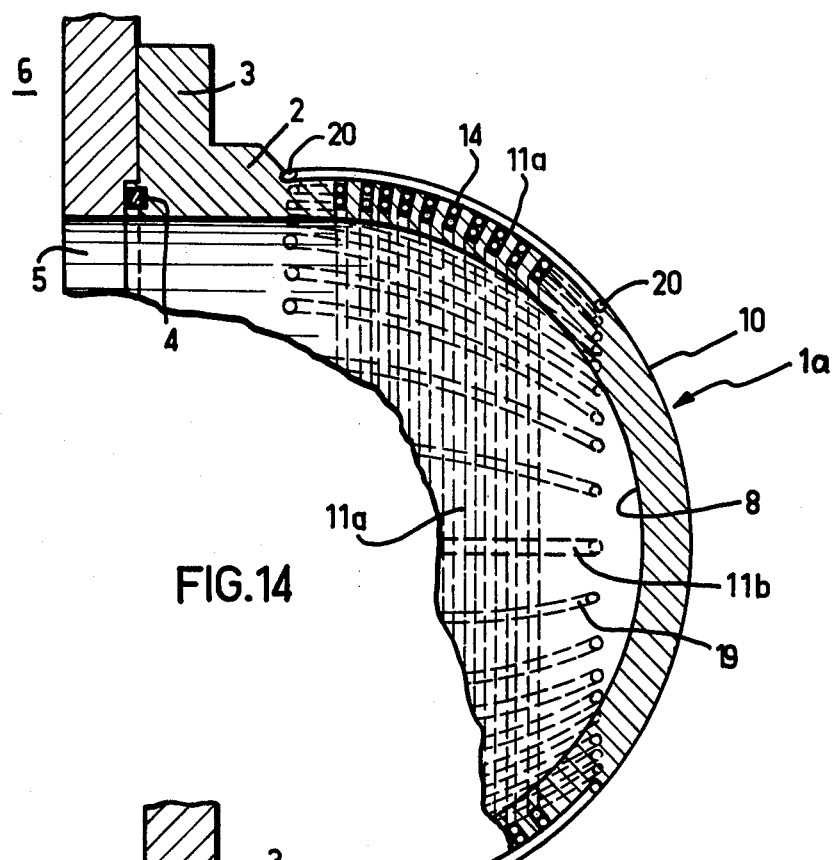
Figure 15:
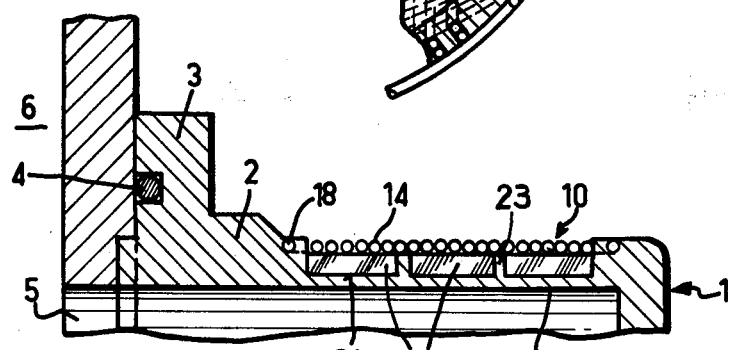
Figure 16:
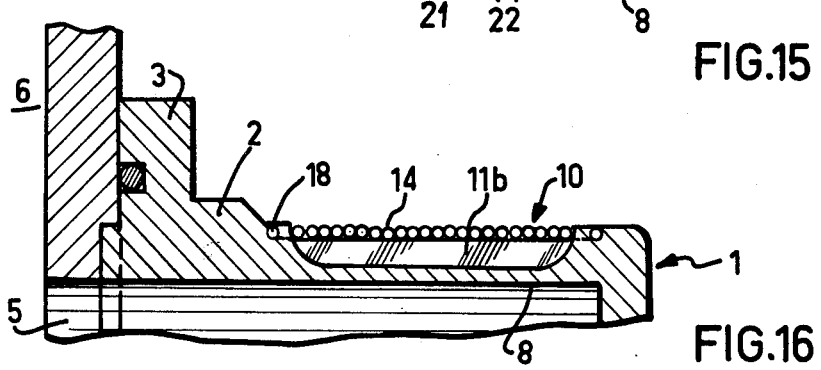

FIGS. 10 and 11 each illustrate cross-sectional views of walls with axial bores in accordance with the invention;

FIG. 12 schematically illustrates the path of the eddy currents, produced under the influence of the magnetic field existing between the pole-rings, in a smooth solid wall and also showing how grooves are cut into such a partition;

FIG. 13 illustrates a simplified lengthwise section through a drive according to the invention for transmitting a force acting alternately in the longitudinal direction;

FIG. 14 illustrates in simplified form a lengthwise section through a hemispherical wall made according to the invention; and FIG. 15 illustrates a partial longitudinal section out of a cylindrical wall with honeycomb-type recesses of the type shown in FIGS. 7 to 9c, and which carries a single-layer winding of prestressed reinforcing elements running substantially in the peripheral direction, supported on the upper edges of the webs between the recesses; and FIG. 16 illustrates a partial longitudinal section through a wall similar to that of FIG. 15 with axial grooves and a layer of winding of parallel reinforcing elements.

In the various Figures analogous or corresponding parts are provided with the same reference numerals.

Figure 1:
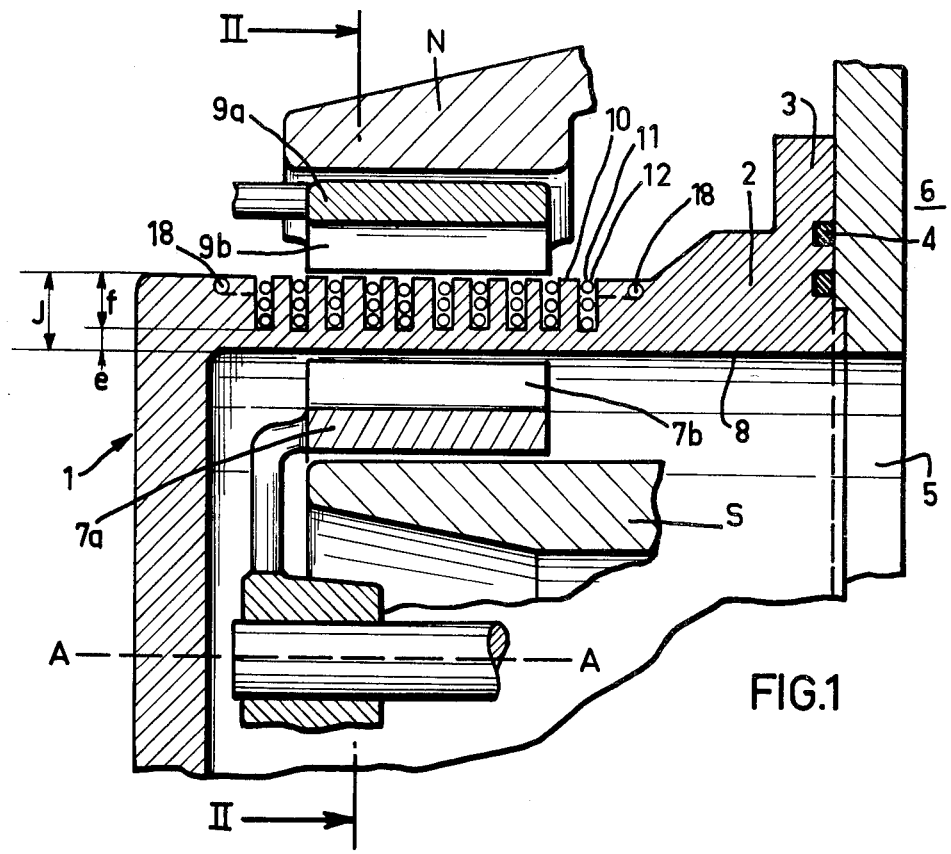
FIG. 1 illustrates a simplified schematic form an axial lengthwise section through a drive according to the invention.
Figure 2:
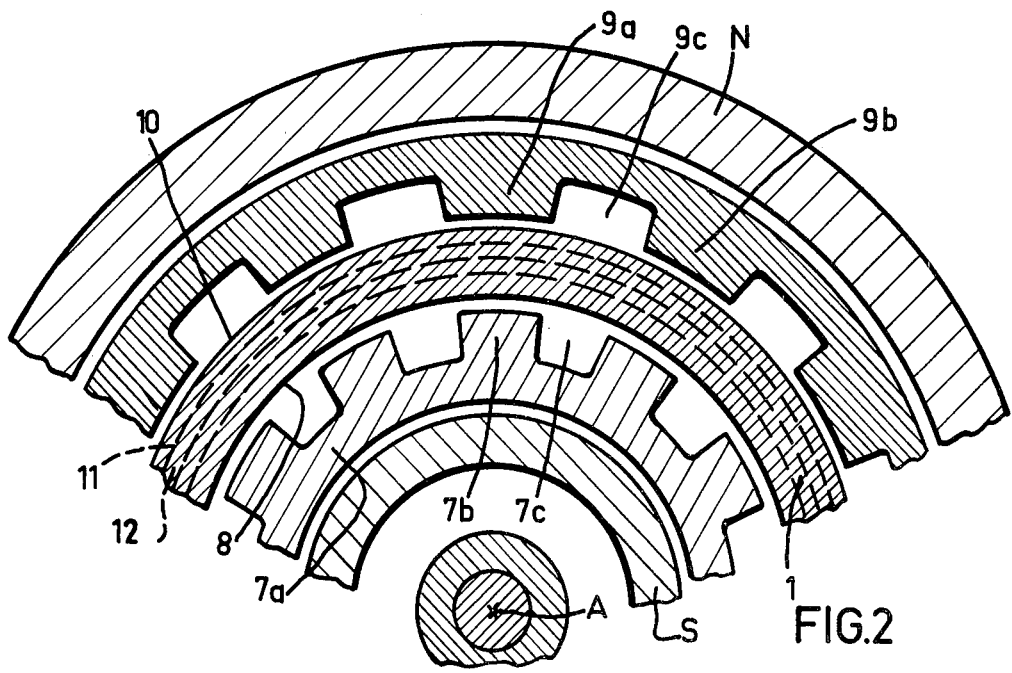
FIG. 2 illustrates a view taken on line II—II of FIG. 1.

Referring to FIGS. 1 and 2, a housing or container 6 which contains a material under high temperature and/or pressure also has an opening 5 through which a rotor 7a passes. The rotor 7a is rotatably mounted in the housing in any suitable manner for any suitable purpose. In addition, a means in the form of a cup-shaped element 1 is mounted on the housing 6 about the opening 5 in sealed manner to seal the contents of the housing 6 to the exterior of the housing 6. The element 1 has a flat base and a cylindrical one-piece peripheral wall disposed on an axis A—A coincident with the axis of the rotor 7a and is filled with the medium contained in the housing 6. The cylindrical wall has a thickness J and, at the end turned away from the flat base, is reinforced by a thickening 2. A flange 3 is also formed on the element 1 to aid in securing the element 1 to the housing 6 and to carry suitable seals 4 to effect a seal-tight fit.

In order to rotate the rotor 7a about the axis A—A, a contactless drive is provided. This drive includes a tooth-like pole-ring 7b on the rotor 7a which defines spaces 7c between the poles, a second coaxial rotor 9a having a similar tooth-like pole-ring 9b with spaces 9c between the poles and means for creating a torus-shaped magnetic circuit passing through the pole-rings 7b, 9b and wall (hereinafter designated "1") of the element 1. The poles of the rotor 7a which is the driven rotor are directed toward a smooth inside surface 8 of the wall while the poles of the outer rotor 9a which is the driving rotor are directed inwardly towards the outside surface 10 of the wall. The pole rings 7b, 9b are thus opposite each other but are separated by the wall 1.

The outside surface 10 of the cylindrical part of the wall 1, in the region between the rotors 7a and 9b has grooves 11 of depth f running in the peripheral direction, into which are inserted under mechanical prestress elongated wirelike electrically-insulating and/or themselves nonconductive reinforcing elements 11.

The means for creating the magnetic circuit includes magnetizable parts of the housing secured to the wall to form a stationary section of the circuit and a coil (not shown) which excites the circuit upon receiving a direct current or a rectified current or via permanent magnets. The manner of installation and the drive of the two rotors 7a and 9b is not given in detail in the drawing nor further described as such is of conventional construction. Similarly, the means for creating the stationary part of the magnetic circuit, as well as those parts of the arrangement in which the magnetic flux, coupling the two rotors, is induced and conducted is not further described since such is conventional. There are here indicated only the two annular smooth poles N and S, between which lies the air-gap of the stationary part of the magnetic circuit which is divided by the wall 1 into two part air-gaps. One rotor (for example the driven rotor 7a and its pole-ring 7b) thus lies concentrically inside the wall 1; and the other (normally the driving rotor 9a and the pole-ring 9b) lies concentrically of the wall 1 in the part air-gap situated outside the housing 6 through which magnetic flux flows from one (N) pole to another (S) pole, becoming magnetized in known manner with opposite polarity, so that they become coupled together through the wall. Such an arrangement is, for example shown in the French Patent No. 1,539,090.

The operation of the drive shown in FIGS. 1 and 2 is as follows:

So long as a magnetic flux becomes induced in the magnetic circuit of the drive, the flux emerges out of the smooth cylindrical inner wall of the outer pole N into the smooth concentrically-situated outer cylindrical surface of the rotor 9a, emerges out of the inner pole-surface of the pole 9b, passes through the wall 1, and reaches the outer pole surfaces of the inner pole-ring 7b, so as to go over the smooth inner bore of the rotor 7a into the pole S, i.e. returning into the stationary part of the magnetic circuit. In this way the circuit is closed torus-fashion over the aforesaid partial air-gap and the pole-rings 7a, b, 9a, b.

As a result of the magnetic force of attraction between the poles of the two pole-rings 7a, b, 9a, b the two pole-rings set themselves on one another so that their poles are in each case opposite, and the main part of the flux in the region of the poles 7b, 9b, passes radially vertically through the wall 1.

Also those regions of the wall 1 which are situated opposite the recesses 7c, 9c of the two pole-rings between the poles 7b, 9b, are permeated by a stray flux perpendicularly of the wall 1. This flux, however, because of the increased air-gap at this place, is considerably less than the flux existing in the region of the poles 7b, 9b. In a first approximation, this stray flux may be neglected.

When the two rotors 7a, 9a, turn opposite the stationary wall 1, then the wall, in known manner, is permeated by a rotating field, because the regions with stronger and weaker flux, corresponding to the poles 7b, 9b, and the pole-gaps 7c, 9c, also are turned with a relative speed V.

If the wall 1 has a certain electric conductivity, as is for example the case with a metallic wall, then because of the varying flux density eddy currents (so-called Foucault currents) occur in its interior whose current intensity is mainly proportional to the variation of magnetic flux density and to the relative speed V.

FIG. 12 shows the approximate pattern of the looped streamlines W of the eddy currents becoming formed in a smooth homogeneous wall without grooves 11. As shown, the wall pass with a speed V from left to right between the poles 7b, 9b (see "Revue Generale de l'Electricite," volume 80, No. 1 of January 1971, page 34). The hatched rectangles a, b, c, etc. indicate the projection of the opposite poles 7b, 9b, at both sides of the moved wall 1. In these regions, the flux permeating the wall 1 vertically is strongest. As against this, the intermediate regions designated 9c–7c are permeated mostly only by a slight stray flux. It is known that the eddy currents for their part, induce a magnetic field acting counter to the variation of the original field intensity, i.e. a force appears acting contrary to the relative movement between the pole-rings 7b, 9b, and the wall 1. Because the wall in the drive described above remains stationary, this counter-force represents a braking force acting on the pole-rings and is undesirable, impairing the efficiency of the drive.

In order to limit the formation of eddy currents, the thickness of the wall 1 which determines the strength of the eddy currents is substantially decreased by the use of recesses. As shown in FIGS. 1 and 2, the recesses are in the form of grooves 11a, 11b extending on the outside of the wall 1 in the peripheral direction and/or in the axial direction (referred to the relative speed V between the poles 7b, 9b and the wall 1). The grooves are of a depth f which considerably limits the formation of the eddy-current loops W and thus their current intensity, at least in the region of these grooves. Through this, the Joule wasted energy, as is known in the technology of electric machines in which the magnetic circuit is composed of metal sheets insulated from one another and through which flows pulsating magnetic fluxes (motors, generators, converters, transformers, choke-coils, and so forth), is substantially reduced.

The disposition of suitably-shaped grooves or other recesses which decrease the thickness J of the wall 1 may also allow an increase in the overall efficiency of a magnetic drive operating through the wall 1 for the contactless transmission of energy between the driving and driven rotors. For this purpose, parallel peripheral or low-pitch helical grooves of depth f, whose bottoms are either rounded 11a, or flat 11c (FIGS. 3 and 4) are provided at the outside 10 of the wall 1. The wall 1 may thus be compared with a pressure-tight partition of reduced thickness e which is reinforced mechanically by solid annular ribs or webs 13, and whose strength, in comparison with that of a solid cylindrical wall of the same thickness J, is markedly, but not decisively, reduced.

The eddy currents produced by the rotation of the poles are now able to develop completely in the remaining thin partition e, whereas in the region f of the grooves, i.e. in the ribs or webs 13, the eddy currents are greatly inhibited in their development.

Figure 3:
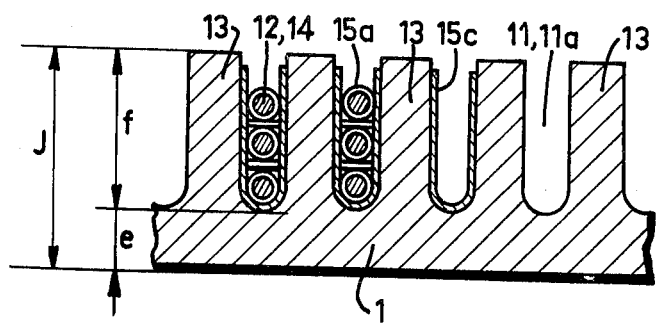
FIG. 3 illustrates a partial cross-sectional view of a modified recess according to the invention.
Figure 5:
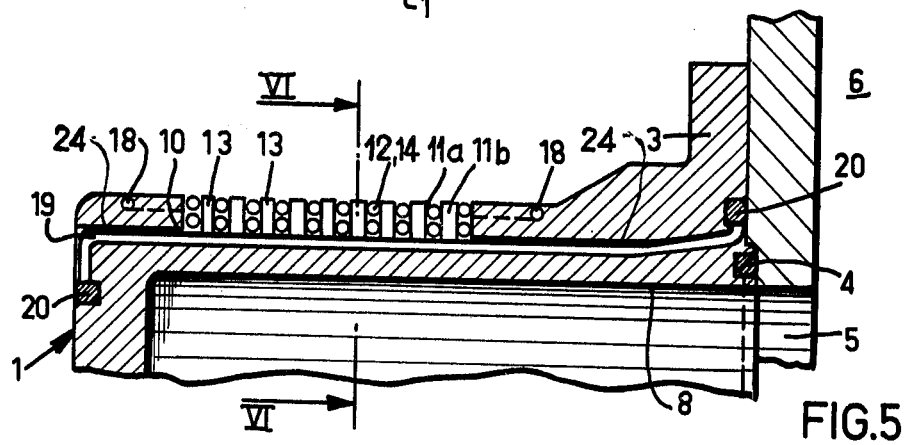
FIG. 5 illustrates a cross-sectional view of a wall having axial and radial recesses in accordance with the invention.

In order to compensate for the reduction of strength caused by providing recesses, prestressed wirelike, strandlike or cablelike nonmagnetizable electrically-nonconductive or at least insulated (layerlike insulations 15a, 15c) reinforcing elements 12, 14, 19, of high mechanical strength are inserted in the grooves 11a, 11b or 11c. These elements 12, 14, 19 are anchored by their ends (18, 20) in the wall 1. The reinforcing elements may for example be made of tantalum or chrome-nickel alloys, or materials having a corresponding crystalline fibrous structure (so-called "whiskers"), which are also capable of withstanding the operating temperatures provided. The peripheral annular 12, or helical 14 reinforcing elements exert a force on the wall 1 which is directed radially inward. With suitable dimensioning, based on the known prestress technique, it is easily possible to impart to the reinforcing elements the tensile strength they need to compensate the weakening of the wall 1 caused by the provision of grooves or other recesses. As shown by FIGS. 1, 3 or 5, several layers of suitably insulated wire or cable reinforcing elements may be positioned in the grooves.

The insulating layers 15a, 15c, on occasion serve to avoid a formation of short-circuits between an electrically-conductive reinforcing element and the side-walls of the grooves, thus avoiding an occurrence of undesirable eddy currents in closed loops.

Figure 4:
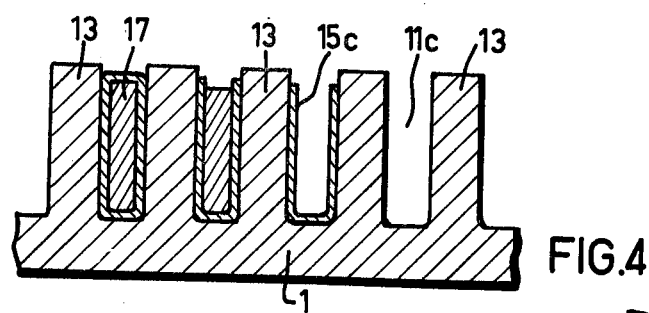
FIG. 4 illustrates a view of a squared recess according to the invention.

Instead of superposed windings 12 of, for example round cross-section, the reinforcing elements may be of any desired cross-section, e.g. rectangular cross-section 17, which permits better utilization of the groove cross-section. In this way, the insulation is advantageously inserted as U-shaped layers or small tubes lining the grooves 11a, b or c, between the reinforcement 17 and the partition 1 (FIG. 4). Glass fabric, enamel, or similar heat-withstanding materials have proved useful for insulating materials in this regard. The ends of the reinforcing elements 12, 14, 17 or 19, may be attached by welding, soldering, bending, pressing or clamping, to the wall 1 at the ends 18 or 20, as shown in FIGS. 1, 5 or 12. However, care must be taken that closed electrically-conductive loops cannot occur.

When a higher temperature occurs in the interior of the housing 6 under operating conditions than outside, the reinforcing elements 12, 14, to be made of a material whose heat-expansion coefficient is approximately the same as that of the material of the wall 1. As a result of the temperature gradient, the inside of the partition (at 8) expands more than the reinforcement-windings disposed outside, so that the prestressing of the windings becomes amplified by a kind of shrinking effect.

Figure 6:
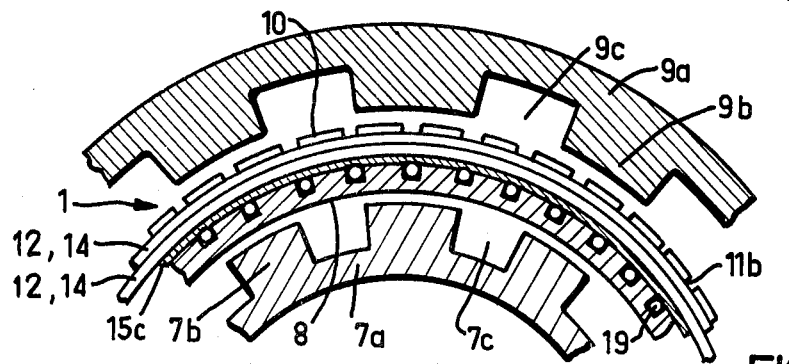
FIG. 6 illustrates a view taken on line VI—VI of FIG. 5.

Referring to FIGS. 5 and 6, the outside 10 of the wall 1 may be provided with a number of axial longitudinal grooves 11b, into each of which is inserted a tensioning cable 19 similar to the reinforcing elements 12, 14, of FIGS. 1 to 4. This cable 19 is introduced through bores 24 extending into the longitudinal grooves 11b. The cable 19 is anchored at both ends 20 in the wall 1 in a prestressed condition. In this way, the axially-acting tensile load on the cylindrical part of the element 1 due to the inner pressure in the housing 6 is resisted. Here too, the tensioning cables 19 are dimensioned so that they compensate the reduction of strength caused by the application of the grooves 11a, 11b.

In addition to the longitudinal grooves 11b, annular or helical grooves 11a, 11c are provided and receive prestressed reinforcing elements 12 or 14 which are wound therein. These elements 12, 14 are insulated (15c) from the longitudinal reinforcements 19 upon which they are supported and press the longitudinal reinforcements 19 against the bottom of the grooves 11b. This construction may be designed for high inner pressures, greater than those possible with the design of FIGS. 1, 2, which has no reinforcements in the lengthwise direction. Apart from the construction of the wall 1, the two constructions of FIGS. 1, 2 and of FIGS. 5, 6 are entirely similar.

Referring to FIGS. 7 to 9c, the eddy currents forming in a smooth partition of uniform thickness J can also be weakened by providing honeycomb-type recesses or depressions 21 at the inside (8) and/or outside 10 of the wall. These recesses 21 have a total depth f (i.e. with the depth f/2 in the case of the honeycomb being at both sides) and a shape at each side which depends on the production-process employed. The webs 22, 23 left between the recesses have the same effect as the webs 13 between adjacent grooves 11a, b or c, in FIGS. 1 to 6 and they form a sort of reinforcement of the thin separating-wall e in the region f.

Figure 7:
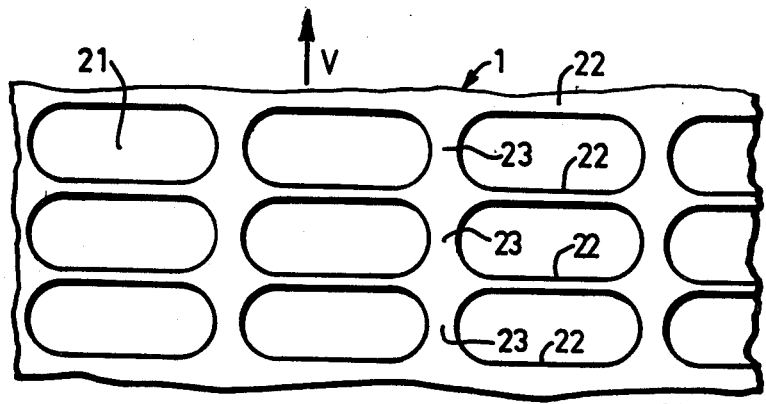
FIG. 7 illustrates a plan view of a wall with rows of elongated depressions in accordance with the invention.
Figure 8:
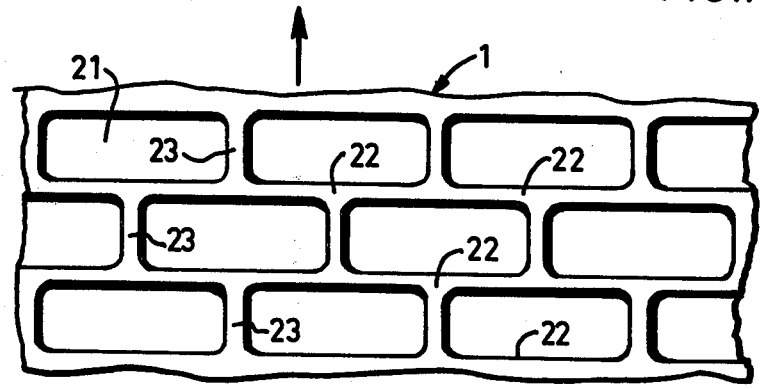
FIG. 8 illustrates a view similar to FIG. 7 of a wall with staggered rows of elongated depressions.
Figure 9A:
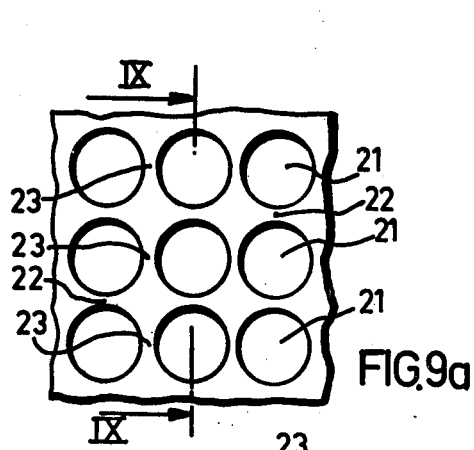
FIG. 9a illustrates a view similar to FIG. 7 of a wall with rows of circular depressions.
Figure 9B:
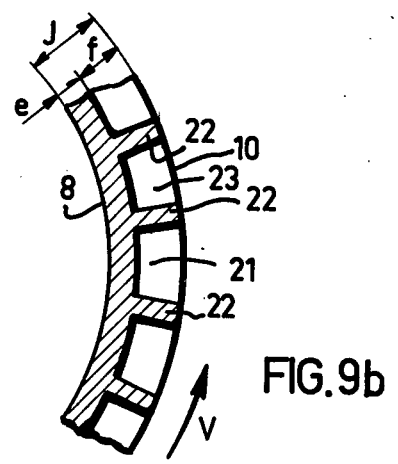
Figure 9C:
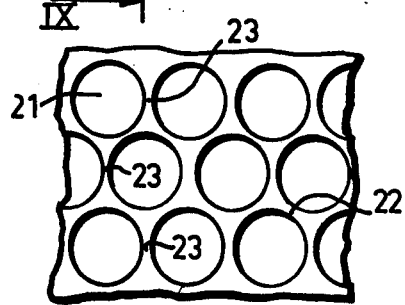
FIG. 9c illustrates a view similar to FIG. 9a of a wall with staggered rows of circular depressions.

The recesses 21 may be elongated and may be disposed in rows (FIG. 7) or offset from one another axially, i.e. staggered (FIG. 8). Similarly, the recesses 21 may be circular since these are easier to machine and impair the strength of the wall to a lesser degree than elongated recesses (FIGS. 7 and 8).

Referring to FIGS. 10 and 11, the cross-section reduction of the thickness of the wall 1 may also be obtained by means of axial bores 24 or 25 running within the wall and which do not open on to either the inside (8) or the outside 10 of the wall 1. Here too, there exists the possibility, similar to the already-shown design of FIG. 5, of installing prestressed reinforcing elements or tensioning cables 19, protected by an insulating layer 15a, without their being held in position by a winding set over them. The bores 24 may be of circular (FIG. 10) of rectangular (FIG. 11) cross-section. In either case, the bores 24 may be used for the flow of a coolant or of a heat-carrying medium, as is for example done with heat-exchangers.

Referring to FIG. 13, wherein like reference characters indicate like parts as above, the drive may be used in a contactless transmission for a rectilinear motion which is periodically reversible, such as is used in an agitator for chemical reactors, and as already described in French Patent No. 1,539,089. As shown, an annular or cylindrical driving slider 26a consists of magnetizable material and has magnetic poles N and S. This slider 26a is able to move axially, and in known manner moves an armature or driven slider 27a to which the slider 26a is coupled by magnetic flux, induced by an excitation coil 28 disposed on the driving slider 26a, via DC or rectified current supplied over a suitable connection 29. The wall 1 has a cylindrical cross-section so as better to take the pressure of the enclosed medium. Helical grooves 11a are formed in the outside 10 of the wall 1 and receives prestressed reinforcing elements 14, as described in FIG. 1.

In the case of higher pressures, of the order of about 200 bar and more, it is advantageous to provide a hemispherical wall 1a as shown in FIG. 14 on the housing 6. In this case, the hemispherical wall 1a has peripheral or helical grooves 11a, and annular or helical reinforcing elements 14 inserted in the grooves, as well as axial and radial grooves 11b with reinforcing elements 19, supported under pressures on the elements 14, similar to the arrangement shown in FIGS. 5 and 6. However, a reversed sequence of reinforcements is used, i.e. the annular ones 12a, 14, 17 and axial/radial ones.

Referring to FIGS. 15 and 16, the wall of the cup-shaped element 1 may alternatively be provided with honeycombtype recesses 22 (FIG. 15) or longitudinal grooves 11b (FIG. 16) on the outside and be reinforced by a one-layer winding installed, without grooves, directly on the webs 13, 22, 23 left between the recesses 22, 11b, respectively.

It is noted that the term "recesses" is used herein as a generic term to the various types of grooves (e.g. FIGS. 3 and 4), webs (e.g. FIGS. 7 to 9) bores or cavities (e.g. FIGS. 10 and 11) and the like specifically described in the various embodiments.

Finally, it should be noted that the foregoing descriptions of forms of construction are given only as examples and are subject to numerous modifications, particularly for adaptation to special specified operating conditions determining the form of the element closing off the housing opening.

Although the invention has been described with reference to couplings in which both movable members which are to be coupled are provided with pole systems, it will be clear that it is equally applicable to asynchronous couplings in which one of the movable members is magnetized by currents induced in it by the difference in speed between the two movable members; for example, a squirrel cage rotor may be used.

What is claimed is:
1. In combination with a housing subject to a high pressure and/or temperature and having a first means movably mounted therein, a contactless drive for moving said first means; said drive comprising
   seconds means secured in sealed relation to said housing about an opening in said housing, said second means including a non-magnetic circumferential wall of high electric resistance extending from said housing, said wall having a plurality of recesses therein;
   a tooth-like pole ring of magnetizable material connected to said first means and disposed coaxially and concentrically within said wall to define an air gap therebetween;
   a third means movably mounted outside said housing and having a tooth-like pole-ring of magnetizable material disposed coaxially and concentrically outside said wall to define an air gap therebetween;
means for creating a closed torus-like magnetic circuit passing through said housing, said pole rings and said wall; and
at least one prestressed reinforcing element of non-magnetizable electrically non-conductive high tensile material reinforcing said wall.

2. The combination as set forth in claim 1 wherein said means for creating said circuit includes magnetizable parts on said housing forming a stationary section of said circuit and a coil for exciting said circuit.

3. The combination as set forth in claim 1 wherein said recess includes grooves in the outside of said wall with said reinforcing element therein.

4. The combination as set forth in claim 1 wherein said element is wound about said wall circumferentially outside said recesses.

5. The combination as set forth in claim 1 wherein said recesses are formed by a helical groove in the outside of said wall and said elongated reinforcing element is in said helical groove.

6. The combination as set forth in claim 5 wherein said reinforcing element has a tensile strength to compensate for the reduction of strength of said wall due to said recesses.

7. The combination as set forth in claim 1 wherein said recesses include axial and radial grooves with prestressed elongated reinforcing elements in said grooves.

8. The combination as set forth in claim 1 which includes a plurality of said prestressed reinforcing elements and wherein said recesses are in the form of honeycomb depressions in the outside of said wall defining webs therebetween and wherein said reinforcing elements are supported at the outer edges of said webs between said depressions.

9. The combination as set forth in claim 1 which includes a plurality of said prestressed reinforcing elements and wherein said recesses are in the form of bores axially within said wall and wherein said elongated reinforcing elements are in said bores.

10. The combination as set forth in claim 9 wherein said elements have a tensile strength to compensate for the reduction in strength of said wall due to said recesses.

11. The combination as set forth in claim 1 wherein said wall is metallic and of one piece.

12. In combination,
a housing having an opening therein;
means secured in sealed relation to said housing to close said opening to the exterior of said housing, said means including a non-magnetic circumferential wall of high electric resistance extending from said housing, said wall having a plurality of recesses therein;
a first rotor rotatably mounted within said housing and having a tooth-like pole-ring of magnetizable material disposed coaxially and concentrically within said wall to define an air gap therebetween;
a second rotor rotatably mounted outside said housing and having a tooth-like pole ring of magnetizable material disposed coaxially and concentrically outside said wall to define an air gap therebetween;
means for creating a closed torus-like magnetic circuit passing through said housing, said pole-rings and said wall; and
means for pre-stressing said wall to reinforce said wall against tensile forces from within.

13. A contactless drive having
a first rotor having a tooth-like pole-ring of magnetizable material;
a second rotor having a tooth-like pole-ring of magnetizable material disposed coaxially and concentrically opposite said first rotor pole-ring;
a wall disposed coaxially and concentrically between said pole-rings to define air gaps with each pole-ring, said wall being of non-magnetic material of high electric resistance and having a plurality of recesses therein;
means for creating a closed torus-like magnetic circuit passing through said pole-rings and said wall; and
reinforcing elements for prestressed reinforcing said wall against tensile forces, said elements being of non-magnetizable electrically non-conductive high tensile material.

14. A contactless drive as set forth in claim 1 wherein said third means is movable rectilinearly to drive said first means rectilinearly.

15. A magnetic coupling for transmitting a force through a pressure-tight wall, comprising a separating wall which has the form of a body of revolution and is to form part of the pressure-tight wall, and a magnetic circuit which includes an outer movable member situated concentrically outside the separating wall and spaced therefrom by an outer air gap, and an inner movable member situated concentrically inside the separating wall and separated therefrom by an inner air gap, at least one of the movable members having a pole system on its surface adjacent the corresponding air gap, the magnetic circuit also including means for producing in the magnetic circuit a magnetic flux which passes from one movable member to the other through one air gap, the separating wall, and the other air gap, and that part of the separating wall through which such magnetic flux passes being made of a non-magnetic material, and being provided with recesses occupying part of its thickness, and also being provided with prestressed reinforcing elements which are nonmagnetic and are not electrically part of the remainder of the separating wall.

16. In combination with a housing subject to a high pressure and/or temperature and having a first means movably mounted therein, a contactless drive for moving said first means; said drive comprising
second means secured in sealed relation to said housing about an opening in said housing, said second means including a non-magnetic circumferential wall of high electric resistance extending from said housing, said wall having a plurality of recesses therein;
a tooth-like pole ring of magnetizable material connected to said first means and disposed coaxially and concentrically within said wall to define an air gap therebetween;
a third means movably mounted outside said housing and having a tooth-like pole-ring of magnetizable material disposed coaxially and concentrically outside said wall to define an air gap therebetween;
means for creating a closed torus-like magnetic circuit passing through said housing, said pole rings and said wall; and
at least one prestressed reinforcing element of non-magnetizable electrically insulated high tensile material reinforcing said wall against tensile forces from within.

17. A contactless drive having
a first rotor having a tooth-like pole-ring of magnetizable material;
a second rotor having a tooth-like pole-ring of magnetizable material disposed coaxially and concentrically opposite said first rotor pole-ring;
a wall disposed coaxially and concentrically between said pole-rings to define air gaps with each pole-ring, said wall being of non-magnetic material of high electric resistance and having a plurality of recesses therein;
means for creating a closed torus-like magnetic circuit passing through said pole-rings and said wall; and
prestressed reinforcing elements for reinforcing said wall against tensile forces, said elements being of nonmagnetizable electrically insulated high tensile material.

* * * * *

UNITED STATES PATENT AND TRADEMARK OFFICE
CERTIFICATE OF CORRECTION

PATENT NO. : 4,146,805
DATED : March 27, 1979
INVENTOR(S) : Henri Fehr et al.

It is certified that error appears in the above-identified patent and that said Letters Patent are hereby corrected as shown below:

Column 8, line 57, "seconds" should read -- second --.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,146,805
DATED : March 27, 1979
INVENTOR(S) : Henri Fehr, Jakob Kaegi and Jose Mallen-Herrero It is certified that error appears in the above-identified patent and that said Letters Patent are hereby corrected as shown below:

Column 10, line 15, change "reinforcing elements for prestressed reinforcing" to --prestressed reinforcing elements for reinforcing--.

Signed and Sealed this

Fourth Day of December 1979

[SEAL]

Attest:

SIDNEY A. DIAMOND

Attesting Officer

Commissioner of Patents and Trademarks